(12) United States Patent
Tsen et al.

(10) Patent No.: US 11,334,120 B2
(45) Date of Patent: May 17, 2022

(54) INFORMATION HANDLING SYSTEM KICKSTAND HINGE

(71) Applicant: Dell Products L.P., Round Rock, TX (US)

(72) Inventors: Chiu Jung Tsen, Hsinchu (TW); John Trevor Morrison, Round Rock, TX (US); Chia-Hao Hsu, Taipei (TW)

(73) Assignee: Dell Products L.P., Round Rock, TX (US)

( * ) Notice: Subject to any disclaimer, the term of this patent is extended or adjusted under 35 U.S.C. 154(b) by 78 days.

(21) Appl. No.: 16/934,435

(22) Filed: Jul. 21, 2020

(65) Prior Publication Data

US 2022/0026948 A1   Jan. 27, 2022

(51) Int. Cl.
*G06F 1/16* (2006.01)
*F16M 11/10* (2006.01)

(52) U.S. Cl.
CPC ............. *G06F 1/166* (2013.01); *F16M 11/10* (2013.01); *F16M 2200/021* (2013.01)

(58) Field of Classification Search
CPC ....... G06F 1/1681; G06F 1/166; F16M 11/10; F16M 13/005
See application file for complete search history.

(56) References Cited

U.S. PATENT DOCUMENTS

| 9,317,072 | B2* | 4/2016 | Park | G06F 1/1615 |
| 9,374,918 | B2 | 6/2016 | Krohn et al. | |
| 9,518,414 | B1* | 12/2016 | Chen | H05K 5/0226 |
| 9,549,479 | B2 | 1/2017 | Gault et al. | |
| 9,752,361 | B2* | 9/2017 | Park | F16M 11/10 |
| 10,001,815 | B1* | 6/2018 | Yao | F16M 13/005 |
| 10,037,057 | B2* | 7/2018 | Schafer | E05D 11/082 |
| 10,606,322 | B2 | 3/2020 | Siddiqui | |
| 10,620,672 | B2* | 4/2020 | Tomky | E05D 3/183 |
| 10,754,392 | B2* | 8/2020 | Wendt | G06F 1/1679 |
| 2007/0236873 | A1* | 10/2007 | Yukawa | G06F 1/16 361/679.22 |
| 2021/0311523 | A1* | 10/2021 | Bai | G06F 1/1626 |

FOREIGN PATENT DOCUMENTS

| EP | 2979152 B1 | 8/2018 |
| EP | 2820506 B1 | 11/2020 |

* cited by examiner

*Primary Examiner* — Bradley Duckworth

(74) *Attorney, Agent, or Firm* — Zagorin Cave LLP; Robert W. Holland

(57) ABSTRACT

An information handling system kickstand hinge with a minimum profile transitions a kickstand between extended and retract positions with a first axle of a stand member that slides between forward and rear positions within guides or a rail housing and a second axle of the stand member that couples to the rail housing with riser arms disposed on opposing sides of the stand member. A first torque engine integrated in the riser housing resists sliding motion of a torque member engages with the first axle. A second torque engine integrated in the stand member resists rotation about the second axle. A spring aligned with the torque member biases the stand member towards the extended position to aid in extension of the kickstand from the retracted position.

20 Claims, 6 Drawing Sheets

INFORMATION HANDLING SYSTEM KICKSTAND HINGE

BACKGROUND OF THE INVENTION

Field of the Invention

The present invention relates in general to the field of portable information handling systems, and more particularly to an information handling system kickstand hinge.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

Recently, dual display portable information handling systems have increased in popularity. Rather than integrating a keyboard in one of the rotationally coupled housing portions, both housing portions have an integrated display. An end user may still type at the information handling system in a clamshell configuration by presenting a virtual keyboard at one of the displays and typing inputs with touchscreen detection of key touches. Dual display information handling systems offer a greater display viewing area to end users when consuming visual information, such as for web browsing, multimedia presentations, video presentations and book reading. One advantage of a dual display system is that removal of the keyboard helps to minimize housing thickness. End users tend to prefer thinner systems that are more compact and easier to store and transport.

In some instances, end users prefer to rest an information handling system on a desktop surface to consume visual information. In order to accommodate this with a dual display system, a kickstand is typically integrated in the rear of the system housing. With the kickstand extending, an end user can have both displays available for viewing visual information while inputting through a peripheral keyboard, effectively mimicking a clamshell configuration with double the viewing area. A kickstand hinge couples to the kickstand to hold the kickstand when extended and retract the kickstand when the end user completes viewing in the raised configuration. Generally, to obtain sufficient support, kickstand hinges include structures of 3.8 to 4 mm in thickness. In order to fit in a dual display system of minimal thickness, a kickstand hinge solution of 3 mm or less is desirable.

SUMMARY OF THE INVENTION

Therefore, a need has arisen for a system and method which provides a robust kickstand solution of minimal height.

In accordance with the present invention, a system and method are provided which substantially reduce the disadvantages and problems associated with previous methods and systems for extending and retracting kickstand at an information handling system. A kickstand hinge uses linear rail slots to constrain a first axle of a stand member sliding in rail housing and riser arms to couple a second axle of the stand member to the rail housing so that the stand member pivots at multiple axles for extended rotational range within a low height structure.

More specifically, an information handling system processes information with a processor and memory disposed in a housing to present the information as visual images at an integrated display. A kickstand extends from a rear surface of the information handling system housing to hold the display in an elevated viewing position when resting on a support surface. A kickstand hinge couples the kickstand to the housing with a rail housing that rotates a stand member between retracted and extended positions about multiple axes. One axis of the stand member slides in opposing guides between a forward and rear position. Another axis of the stand member rotates about riser arms that rotationally couple at a fixed forward position of the rail housing. In the retracted position, the stand member first axis slides to a rear position to bring the stand member into the rail housing. In the extended position, the first axis slides to a forward position in front of the second axis to provide a space-efficient over rotation of the stand member of approximately 125 degrees. A multi-torque solution integrates a first torque engine in the rail housing that interfaces with a torque member coupled at the first axis and a second torque engine in the stand member coupled at the second axis. A spring aligned with the torque member compresses in the retracted position to aid extension of the stand member.

The present invention provides a number of important technical advantages. One example of an important technical advantage is that an information handling system kickstand hinge provides a minimal height footprint to support low profile portable information handling systems, such as dual display systems. In a retracted configuration, all moving parts lay flat in a common plane for minimal structural thickness, such as 3 mm or less. Dual pivot rotation between closed and open positions provides a detent feel for an end user based upon the relative position of the sliding axis and riser arm axis. A multi-torque solution provides a smooth and variable torque profile that readily adopts for systems of different heights and weights.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system kickstand hinge minimizes height with a multi-pivot stand member. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
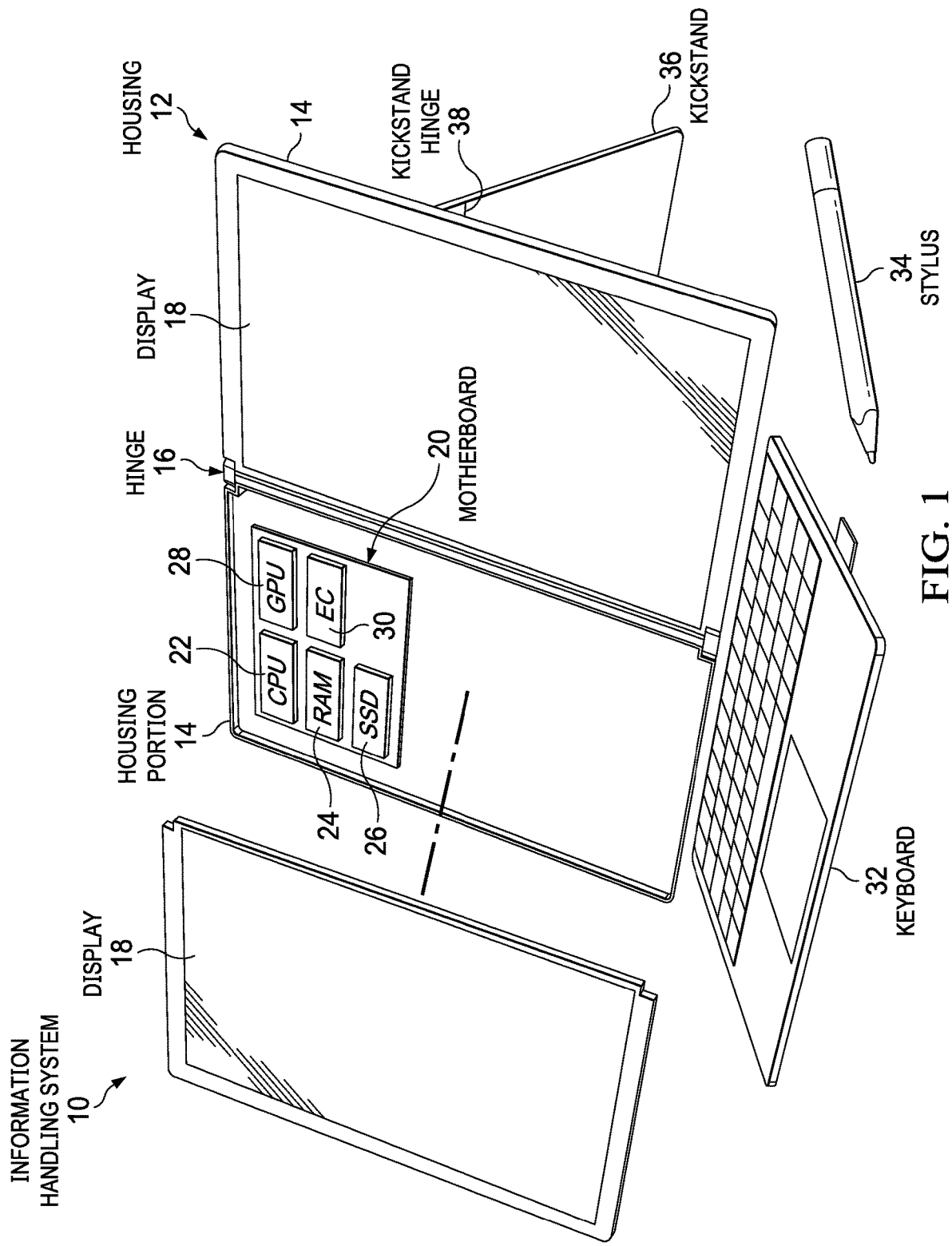
FIG. 1 depicts an exploded view of a dual screen portable information handling system.

Referring now to FIG. 1, an exploded view depicts a dual screen portable information handling system. In the example embodiment, information handling system 10 has a portable housing 12 with first and second housing portions 14 rotationally coupled by a hinge 16 to rotate between closed and open positions. As shown, housing 12 rotates to an open tablet position having first and second displays 18 integrated in first and second housing portions 14 aligned in a common plane. A motherboard 20 disposed in housing 12 supports processing components that cooperate to process information. For example, a central processing unit (CPU) 22 executes instructions that process information in cooperation with a random access memory (RAM) 24 that stores the instructions and information. A solid state drive (SSD) 26 or other non-transitory memory stores instructions and information during power down states, such as an operating system and applications that are retrieved to RAM 24 at system power up. A graphics processor unit (GPU) 28 processes information to define visual images for presentation at displays 18, such as with pixel values that define colors for presentation at display pixels. An embedded controller 30 manages system operating constraints, such as power and thermal operating conditions, and interactions with external peripheral devices, such as keyboard 32 interfaced through a cable or wireless communication medium. Displays 18 include a touchscreen sensor, such as a capacitive sensor, to detect touch inputs, such as with a finger or a stylus 34.

In the example embodiment, information handling system 10 is raised to an elevated viewing position over a support surface, such as a desktop, by a kickstand 36 that extends out a rear side of housing 12. Kickstand 36 extends and retracts at a kickstand hinge 38 that rotates out kickstand 36 from a flat stored position to an extended position against which housing 12 leans to provide a viewing position. In one embodiment, kickstand 36 rotates approximately 125 degrees to achieve the extended position. Kickstand hinge 38 includes torque engines that resists rotation sufficiently to maintain kickstand 36 in the extended and retracted positions once established by an end user.

Figure 2:
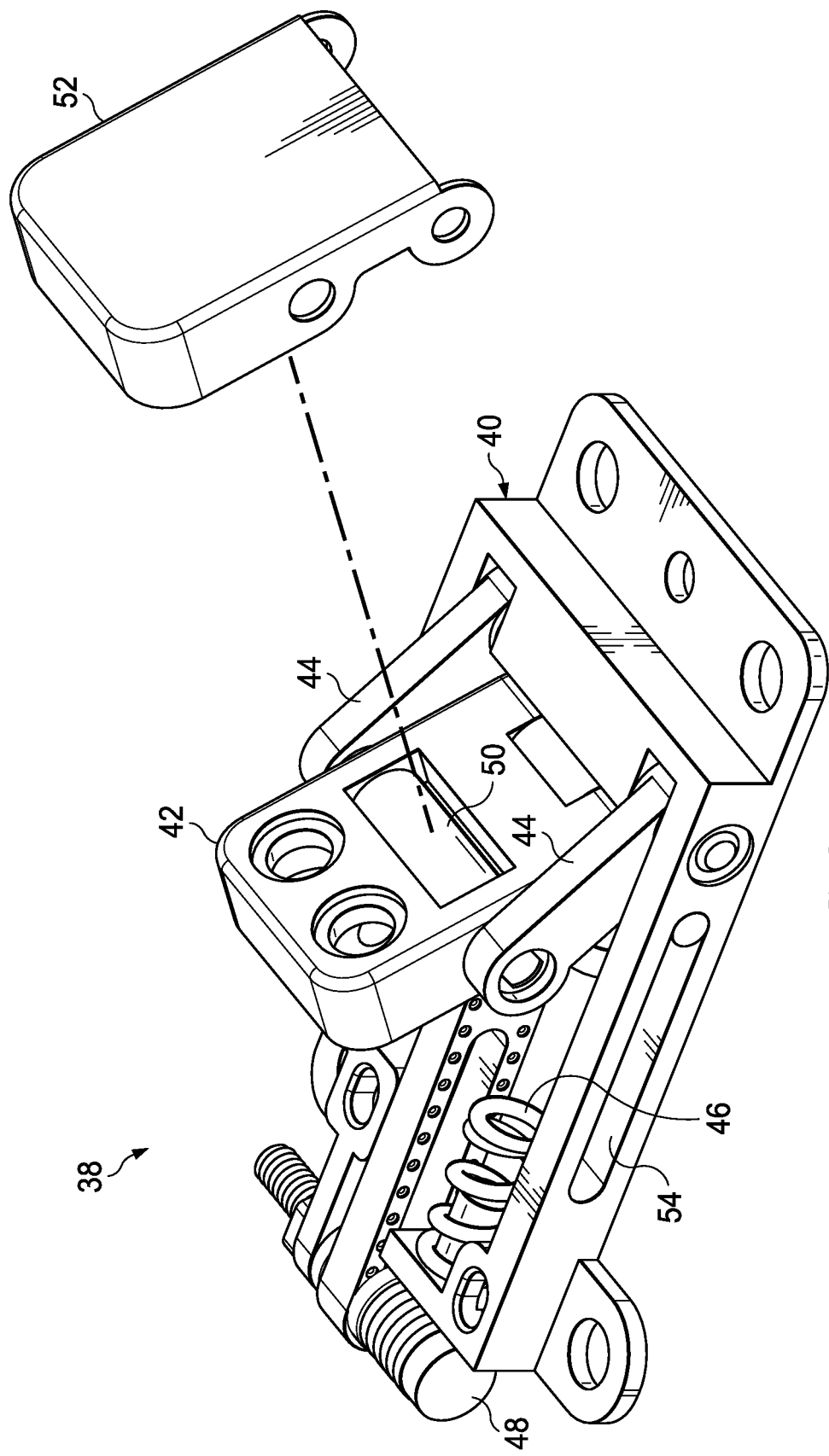
FIG. 2 depicts a front perspective view of a kickstand hinge in an extended position.

Referring now to FIG. 2, a front perspective view depicts kickstand hinge 38 in an extended position. A rail housing 40 includes screw openings to couple to an information handling system housing at the rear side and rotationally couples a stand member 42 having an outer planar face with screw openings to couple to a kickstand. Stand member 42 rotates about a central axis having a torque engine 44 integrated in stand member 42 to resist rotation. First and second riser arms 44 couple at a first end to stand member 42 at the rotation axis and at a second end to rail housing 40. Stand member 42 rotates about a sliding axis having linear motion defined by guides 54 formed in rail housing 40 with resistance about the sliding axis provided by a torque engine 48 coupled at a rear side of rail housing 40 and translated through a torque member that couples at the sliding axis. A spring 46 aligns with the torque member to provide a bias for aiding extension of stand member 42 when stand member 42 moves to the retracted position within rail housing 40 as described below.

Figure 3:
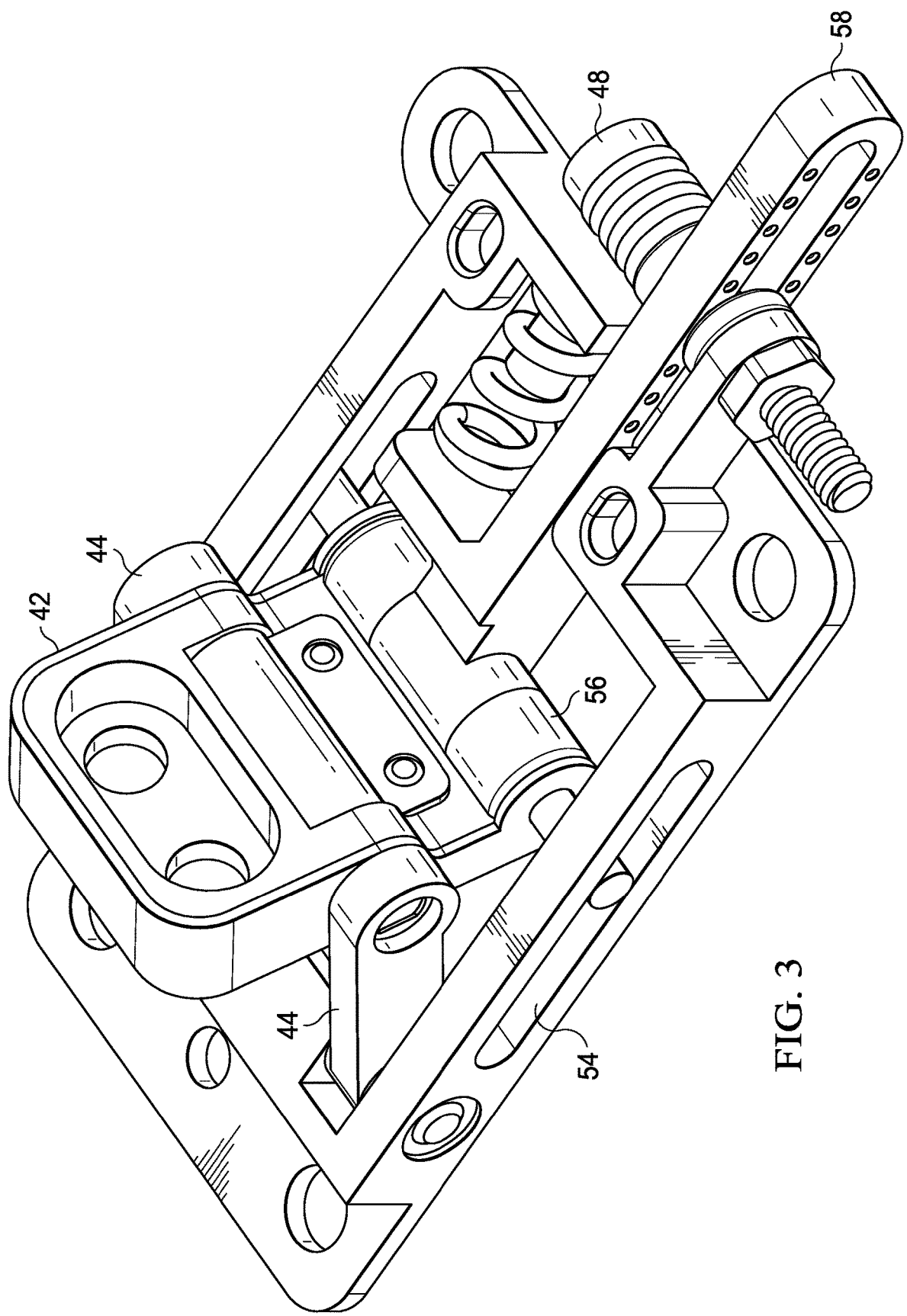
FIG. 3 depicts a rear perspective view of a kickstand hinge in the extended position.

Referring now to FIG. 3, a rear perspective view depicts kickstand hinge 38 in the extended position. Torque member 58 couples at the sliding axis 56 to move with stand member 42 as rotation of stand member 42 slides the axis in guides 54. Torque member 58 has an opening through which torque engine 48 couples to resist the sliding motion and thus the rotation of stand member 42. Dual torque engines 48 and 50 provide a smooth and variable resistance to rotation of stand member 42 through the extended and retracted positions. For example, torque member 58 may have a varied thickness that passes through torque engine 48 so that torque is reduced through extending and retracting movements but increased when fully extended and retracted. In the extended position as depicted, sliding motion in guide 54 of the sliding axis to the rear of the central axis of stand member 42 at riser arms 44 creates a detent feel since stand member 42 has to over rotate past a perpendicular orientation to move from the depicted extended position to a retracted position.

Figure 4:
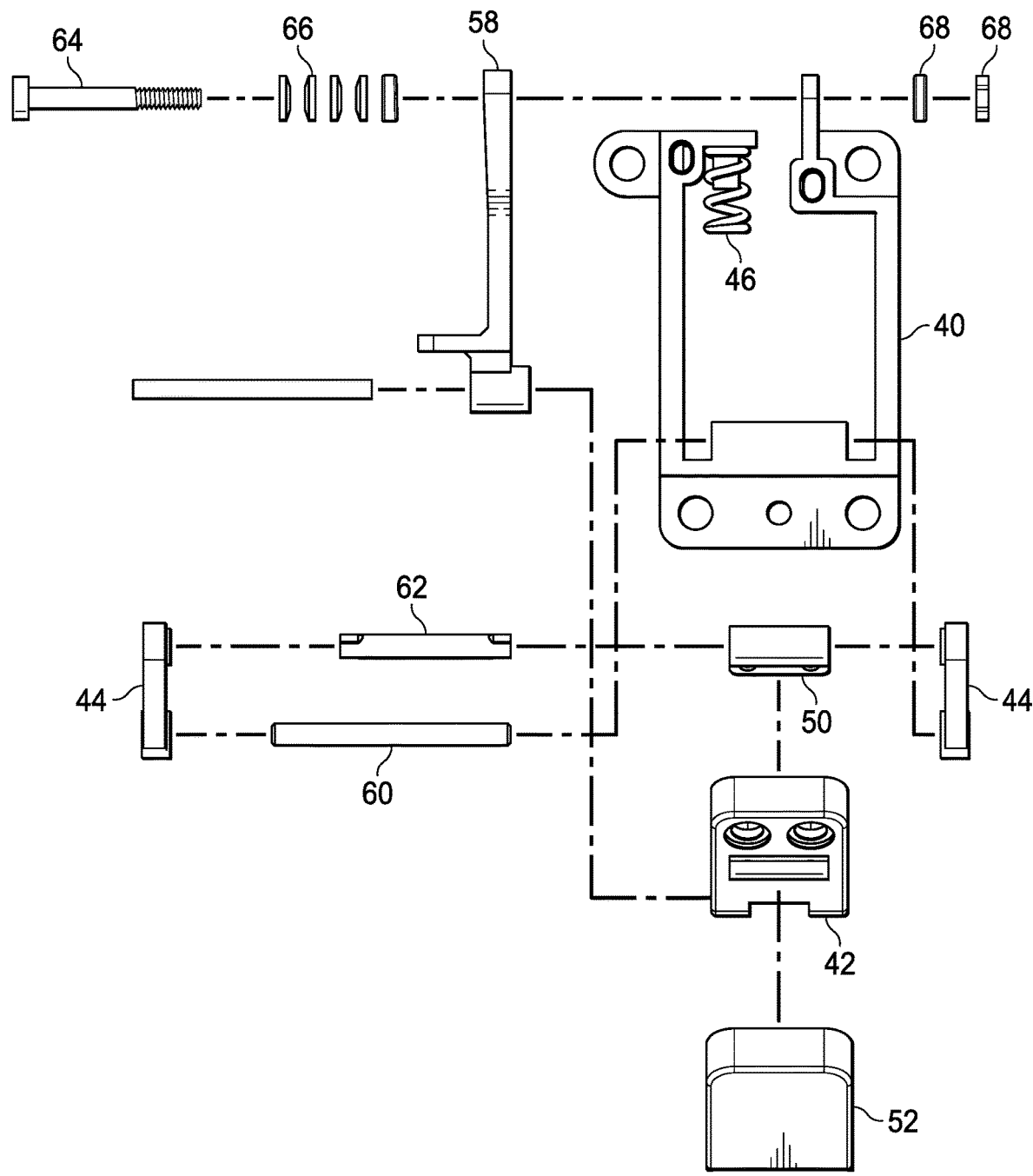
FIG. 4 depicts a top exploded view of a kickstand hinge.

Referring now to FIG. 4, a top exploded view depicts kickstand hinge 38. A torque shaft 62 has a pin 60 inserted through it. Torque shaft 62 fits through torque member 58 to translate sliding motion while pin 60 provides an axle at the lower rotation axis of stand member 42. Torque member 58 extends an arm out to interact with spring 46 when torque member 58 slides towards the rear position. Torque member 58 couples by a torque shaft 64 passed through rail housing 40 and generates friction by pressing friction plates and spring washers 66 against the sides of torque member 58 and coupled in place by nuts 68. The amount of resistance against sliding motion of torque member 58 varies based upon the thickness of torque member 58 as it slides through the friction and spring washer assembly. Riser arms 44 couple at the center rotation axis of stand member 42 with torque engine 50 to resist rotation as stand member 42 rotates and lifts through sliding motion of pin 60 in the guides of rail housing 40. A cover 52 fits over stand member 42 to provide an aesthetic appearance. For instance, cover 52 is a deep draw sheet metal cover that snaps in place over stand member 42.

Figure 5:
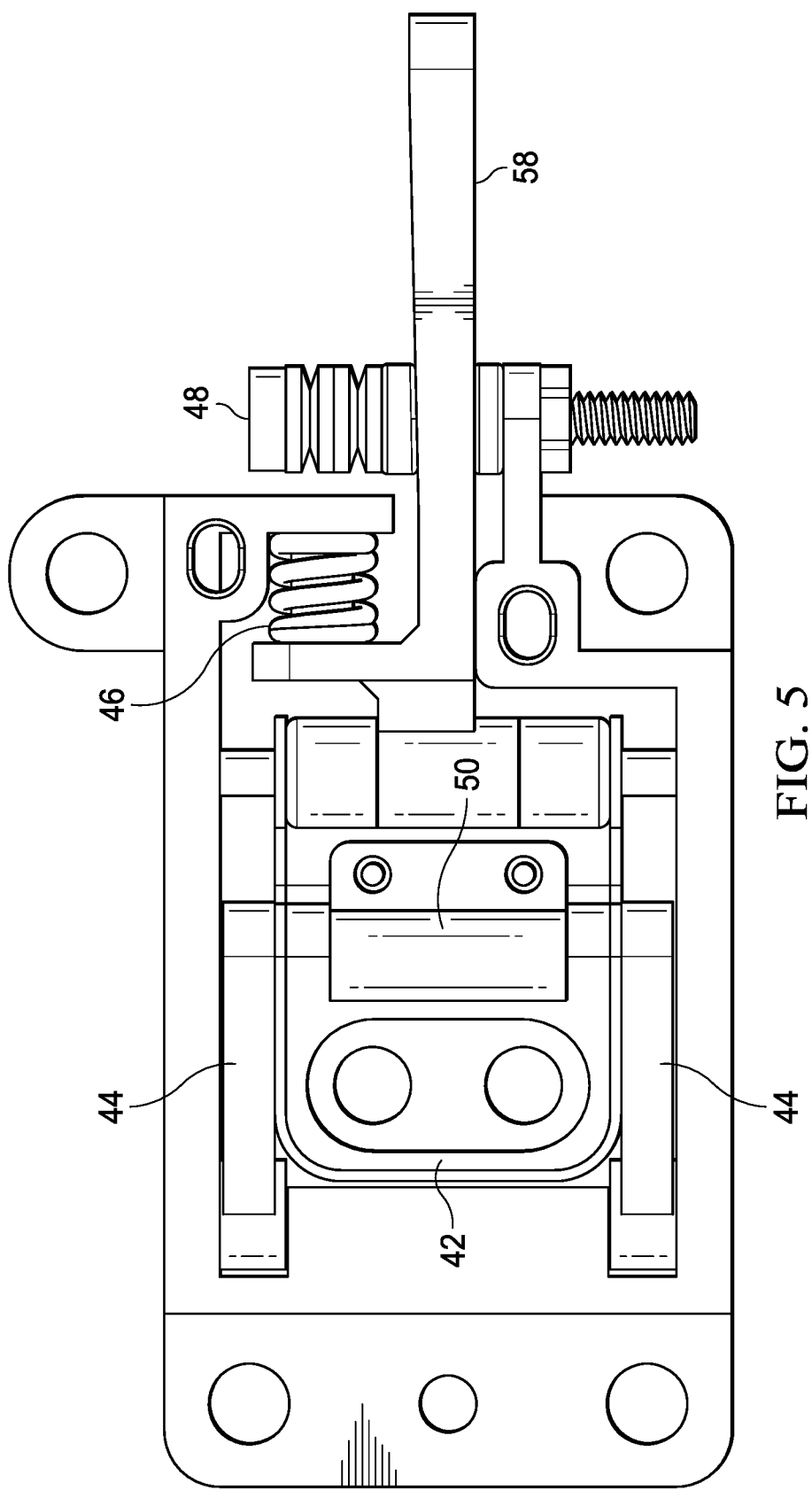
FIG. 5 depicts a top view of a kickstand hinge in a retracted position.

Referring now to FIG. 5, a top view depicts kickstand hinge 38 in a retracted position. In the retracted position, riser arms 44 rotate stand member 42 to a flat position within rail housing 40 that has minimal height. Torque member 58 slides out the rear side of rail housing 40 to create torque as torque engine 48 presses against its side surfaces. Spring 46 presses against torque member 58 to provide an upward biasing force that is neutralized by flat alignment of stand member 42. At an initial rotation of stand member 42 out of rail housing 40, spring 46 provides the outward bias for approximately 30 degrees of rotation of stand member 42 out of rail housing 40. As with the fully extended position where the sliding axis provides a detent feel when slid towards the front of rail housing 40 and in a position in front of the central axis of stand member 40, the fully retracted position relationship of the sliding axis and central axis provides a detent feel for storing the kickstand in the information handling system.

Figure 6:
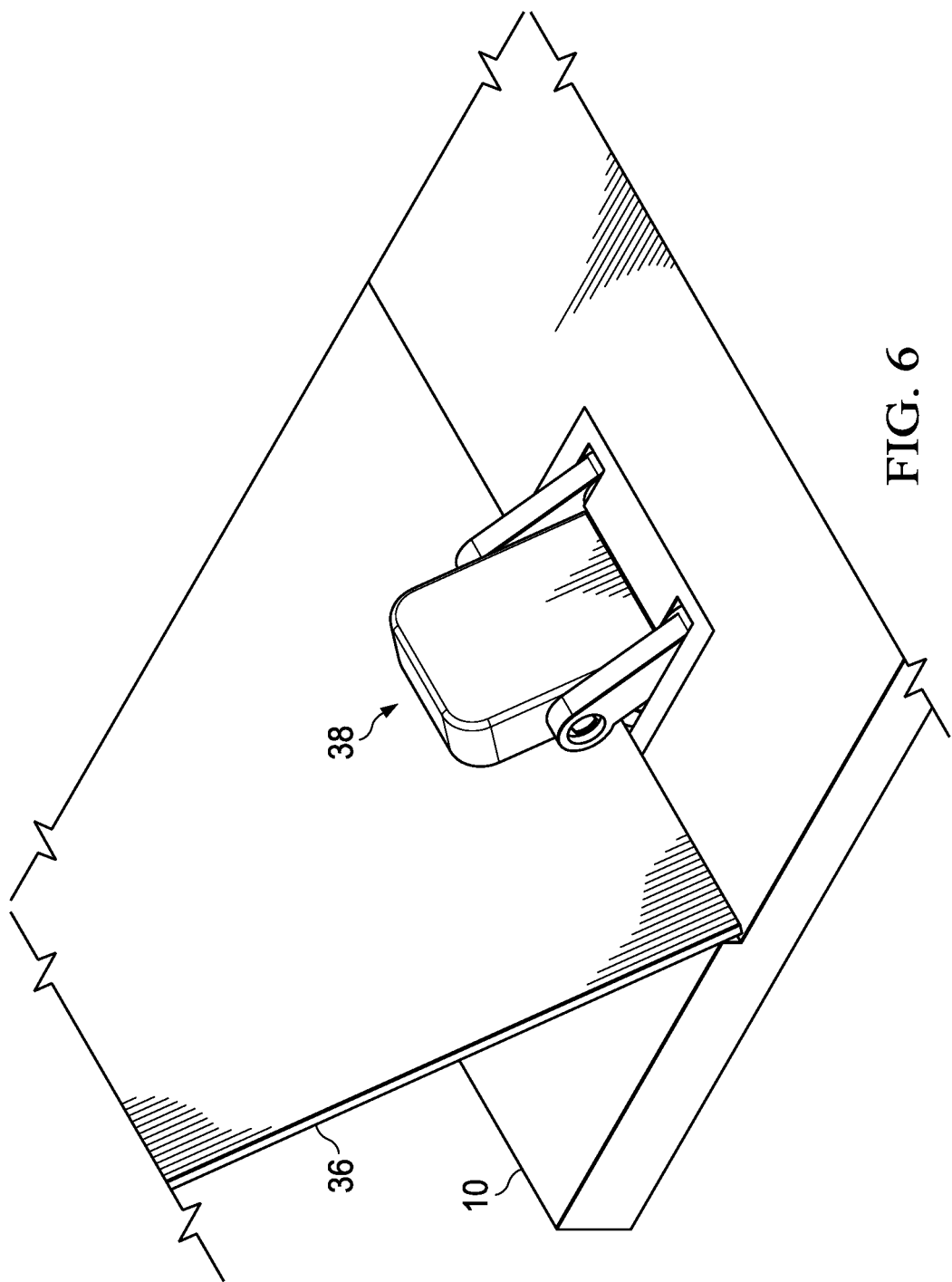
FIG. 6 depicts a rear perspective view of an information handling system having a kickstand hinge extending a kickstand.

Referring now to FIG. 6, a rear perspective view depicts an information handling system 10 having a kickstand hinge 38 extending a kickstand 36. In the extended state, kickstand hinge rotates approximately 125 degrees relative to the retracted state. The sliding axis position and torque engines cooperate to maintain kickstand 36 in the extended position in a robust manner that will support touch inputs and stylus interactions. Varied torque, such as provided by varied thickness of the torque member as it slides through the torque engine. The end user rotates kickstand 36 with an initial increased resistance at the extended position, then has less resistance until the closed position where the sliding axis position relative to the support member and increased torque resistance maintain kickstand 36 flat against the back surface of information handling system 10.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   a processor disposed in the housing and operable to execute instructions to process information;
   a memory disposed in the housing and interfaced with the processor, the memory operable to store the instructions and information;
   a display integrated in a front side of the housing and interfaced with the processor to present the information as visual images;
   a kickstand disposed at a rear side of the housing to extend out and support the housing in an elevated configuration relative to a support surface; and
   a hinge rotationally coupling the kickstand and housing, the hinge having a rail housing with first and second guides formed on opposing sides and a stand member rotationally coupled to the rail housing at first and second axes, the first axis having a pin extending between the first and second guides and configured to slide relative to the rail housing between a front position and rear position of the rail housing, the second axis rotationally coupled to the rail housing by first and second riser arms at opposing sides of the stand member, the riser arms rotationally coupled to the rail housing at the front position.

2. The information handling system of claim 1 wherein the hinge further comprises a first torque engine integrated in the stand member at the second axis and operable to resist rotation of the stand member relative to the riser arms.

3. The information handling system of claim 2 wherein the hinge further comprises:
   a torque member rotationally coupled to the first axis pin, the torque member having a slot; and
   a second torque engine coupled to the rail housing at the rear position and engaged with the slot to resist movement of the stand member sliding in the first and second guides.

4. The information handling system of claim 3 wherein the hinge further comprises a spring coupled to the rail housing at the rear position and aligned to bias the torque member towards the forward position.

5. The information handling system of claim 4 wherein the first axis slides to a forward position under the first and second riser arms when the stand member rotates to a raised position over the rail housing.

6. The information handling system of claim 5 wherein the hinge couples to the kickstand at the stand member, the hinge further comprising a cover configured to snap over the stand member.

7. The information handling system of claim 5 wherein the housing comprises first and second rotationally coupled housing portions that rotate between a closed and a tablet position.

8. The information handling system of claim 7 further comprising first and second displays, the first display integrated in the first housing portion, the second display integrated in the second housing portion.

9. The information handling system of claim 5 wherein the stand member rotates from an orientation planar with the housing to an orientation of approximately 125 degrees relative to the housing.

10. A method for supporting an information handling system in a viewing position, the method comprising:
    coupling a kickstand to a rear surface of the information handling system with a hinge having a rail housing couple to the information handling system and a stand member coupled to the kickstand;
    rotating the stand member out of the rail housing about first and second axles to extend the kickstand, the first axle sliding in the rail housing, the second axle coupled to the rail housing by first and second riser arms, the first axle sliding towards the second axle; and rotating the stand member into the rail housing about the first and second axles to retract the kickstand, the first axle sliding in the rail housing away from the second axle.

11. The method of claim 10 further comprising:
integrating a torque engine in the stand member at the second axle; and
resisting rotation of the stand member with the torque engine.

12. The method of claim 10 further comprising:
coupling a torque member to the first axle;
coupling a torque engine to the rail housing and the torque member; and
resisting rotation of the stand member by resisting sliding of the first axle with the torque engine.

13. The method of claim 12 further comprising:
varying a thickness of the torque member; and
varying the resisting by passing the varying thickness through the torque engine.

14. The method of claim 12 further comprising:
aligning a spring to engage against the torque member when the stand member rotates to the retracted position; and
biasing the stand member towards the extended position with the spring.

15. The method of claim 10 wherein:
the first axle slides forward of the second axle when the kickstand fully extends; and
the first axle slides rearward of the second axle when the kickstand fully retracts.

16. The method of claim 15 wherein the stand member rotates approximately 125 degrees between retraction and extension of the kickstand.

17. A hinge comprising:
a rail housing having guides on opposing sides;
a stand member configured to couple to a kickstand;
a first axle coupled to the stand member and sliding in the guides between a forward position and a rear position;
a second axle coupled to the stand member distal the first axle; and
first and second riser arms coupled to opposing sides of the stand member at the second axle and to the rail housing, the stand member rotating about the first and second axles between an extended position having first axle slid to the forward position and a retracted position having the first axle slid to the rear position.

18. The hinge of claim 17 further comprising a torque engine integrated in the stand member at the second axle to resist rotation of the stand member about the second axle.

19. The hinge of claim 17 further comprising:
a torque member coupled to the stand member at the first axle to slide with the first axle between the forward and rear positions; and
a torque engine coupled to the rail housing and engaged with the torque member to resist sliding motion of the first axle in the guides.

20. The hinge of claim 19 further comprising a spring aligned to bias against the torque member in the rear position.

* * * * *